(12) United States Patent
Madden, Jr. et al.

(10) Patent No.: US 12,248,573 B2
(45) Date of Patent: Mar. 11, 2025

(54) METHOD AND APPARATUS FOR DETECTING THE OCCURRENCE OF A RANSOMWARE ATTACK ON A STORAGE VOLUME

(71) Applicant: Dell Products, L.P., Hopkinton, MA (US)

(72) Inventors: John Madden, Jr., Holden, MA (US); Benjamin A. F. Randolph, Uxbridge, MA (US); Jeremy O'Hare, Westborough, MA (US); Rong Yu, West Roxbury, MA (US)

(73) Assignee: Dell Products, L.P., Hopkinton, MA (US)

( * ) Notice: Subject to any disclaimer, the term of this patent is extended or adjusted under 35 U.S.C. 154(b) by 309 days.

(21) Appl. No.: 17/578,574

(22) Filed: Jan. 19, 2022

(65) Prior Publication Data

US 2023/0229773 A1   Jul. 20, 2023

(51) Int. Cl.
   *G06F 21/56* (2013.01)

(52) U.S. Cl.
   CPC ...... *G06F 21/566* (2013.01); *G06F 2221/034* (2013.01)

(58) Field of Classification Search
   CPC .................. G06F 21/566; G06F 2221/034
   See application file for complete search history.

(56) References Cited

U.S. PATENT DOCUMENTS

| 2018/0322281 A1* | 11/2018 | Borlick | G06F 21/554 |
| 2022/0092180 A1* | 3/2022 | Richardson | G06F 21/64 |

\* cited by examiner

*Primary Examiner* — Alexander Lagor
*Assistant Examiner* — Shu Chun Gao
(74) *Attorney, Agent, or Firm* — Anderson Gorecki LLP (57) ABSTRACT

A Ransomware Activity Detection System (RADS) characterizes historic read/write IO activity on a storage volume, and also characterizes historic data characteristics of the storage volume, such as the percentage reducibility of the data held in the storage volume. The RADS monitors the storage volume to identify differences between current read/write IO activity and historic read/write IO activity, as well as difference between current data characteristics of the storage volume and historic data characteristics of the storage volume. When the RADS detects a significant difference in read/write IO activity on a storage volume, that is coupled with a significant changes to the data characteristics of the storage volume, the RADS protects the storage volume and generates an alert of the possible occurrence of a ransomware attack. Protection may occur prior in connection with any bulk read operation to proactively protect storage volumes against ransomware attacks.

12 Claims, 6 Drawing Sheets

METHOD AND APPARATUS FOR DETECTING THE OCCURRENCE OF A RANSOMWARE ATTACK ON A STORAGE VOLUME

FIELD

This disclosure relates to computing systems and related devices and methods, and, more particularly, to a method and apparatus for detecting the occurrence of a ransomware attack on a storage volume.

BACKGROUND

Ransomware attacks often involve a third party accessing a volume of data on a storage system, encrypting the data, and then writing the volume of data back to the storage system. The ransomware attacker then asks for money to provide a key to decrypt the data. The earlier a ransomware attack is detected, the less impact the ransomware attack will have.

There are three basic ransomware detection techniques-detecting by signature, detecting by abnormal network traffic, and detecting by data behavior. Detecting ransomware by signature is used by many antivirus solutions. The ransomware signature is part of the ransomware code that is used to identify a specific ransomware strain. Unfortunately, ransomware code is constantly evolving as ransomware attackers create new versions of the ransomware, which means that detecting by ransomware signature requires constant updates and is reactionary, rather than proactive. These systems also are often not able to detect modified ransomware, and hence are not able to prevent ransomware until it becomes a known problem Detecting ransomware by abnormal network traffic involves traffic analysis. The basic idea is to examine data traffic to find abnormalities in the amount or type of network traffic to/from a storage system that is used to store the data that is being attacked. Example traffic analysis solutions that use this technique include GreyCortex Mendel, and Cisco ETA (Encrypted Traffic Analytics). Unfortunately, this type of analysis has a fairly high false positive rate, since many traffic anomalies involve legitimate movement of data on a network by the underlying applications and are not related to ransomware attacks.

Detecting ransomware by looking at data behavior involves monitoring files and looking for anomalies in the data that is being stored. Example systems that implement this type of ransomware detection include some antivirus systems such as Carbon Black, and data protection software such as SpinOne. A downside to this type of ransomware detection technique, is that the files need to be executed incorrectly for some period of time to confirm that an attack is occurring, which results in at least some percentage of data being compromised before the existence of a ransomware attack can be detected.

Since ransomware attacks are increasing in frequency and severity, it would be advantageous to provide a storage array autonomous ransomware activity detection and data loss prevention system that would operate at the storage system level to detect likely ransomware activity on storage volumes, to proactively protect the data against ransomware attacks.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, a Ransomware Activity Detection System (RADS) characterizes historic read/write IO activity on a storage volume, and also characterizes historic data characteristics of the storage volume, such as the percentage reducibility of the data held in the storage volume. The RADS monitors the storage volume to identify differences between current read/write IO activity and historic read/write IO activity, as well as difference between current data characteristics of the storage volume and historic data characteristics of the storage volume. When the RADS detects a significant difference in read/write IO activity, coupled with a significant difference in data characteristics, the RADS protects the storage volume and generates an alert of the possible occurrence of a ransomware attack. Since the RADS knows what read/write IO activity and data characteristics are normal (historic) for a given storage volume, the RADS is able to detect anomalies in the historic read/write IO activity and detect anomalies in the data characteristics for the storage volume, and only generates a ransomware alert when changes in both the read/write IO activity and data characteristics correspond to known patterns identified as indicative of a possible occurrence of a ransomware attack. By monitoring for differences in both the read/write IO activity as well as data characteristics, on a per-storage volume basis, it is possible for the RADS to greatly reduce the number of false ransomware alerts that are generated. By protecting the data whenever a ransomware attack is suspected, the RADS is able to greatly reduce the amount of data lost during the suspected ransomware attack.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
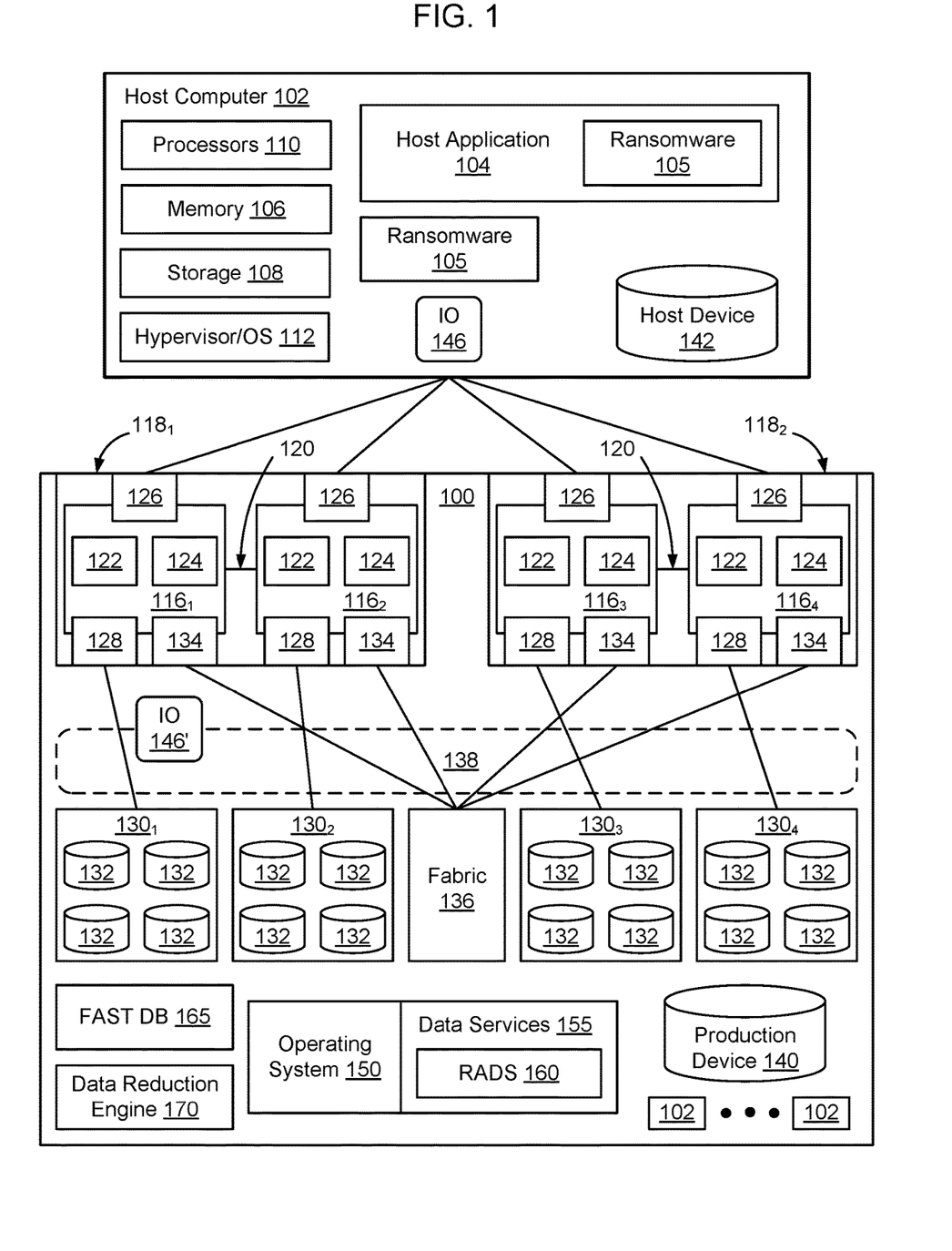
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

As used herein, the term "storage volume" 220 (see FIG. 2) will refer to a collection of tracks of data maintained by backend storage resources 130 of the storage system 100 that are logically associated with each other. In some embodiments, production device 140 is an example of a storage volume. The term "storage volume" 220 as used herein, is not limited to production device 140 and encompasses, for example, collections of production devices 140 or a portion of a production device 140 depending on the implementation.

As shown in FIG. 1, in some instances a host application 104 will become infected by ransomware 105. In other instances, the ransomware 105 will be a separate application on the host computer 102. In other instances, the ransomware 105 may exist on a separate computer or on the storage system 100. Regardless of the origin of the attack, ransomware will often operate to encrypt data stored on a storage volume 220, to prevent the host application 104 from accessing the data stored on storage volume 220. Specifically, once encrypted, when the host application 104 issues a read operation on host device 142, the data that is returned by the storage system 100 will be encrypted with an encryption key used by the ransomware 105, such that the host application 104 is not able to decipher the data that was returned by the storage system 100.

To recover the original data, the host application 104 will need to access a different copy of the data, such as a backup copy, to enable the host application to resume operation. Depending on the type of attack, for example if the ransomware 105 has not been removed from the host 102, accessing the backup copy of the data can cause the backup copy to also be affected by the ransomware attack. One way to resolve the ransomware attack is for the host 102 to obtain access to a decryption key, to enable the host 102 to decrypt the data stored in storage volume 220, but this resolution is often undesirable since it often involves payment of money to the person who initiated the ransomware attack.

To encrypt the data stored on storage volume 220, the ransomware 105 typically will read the data from the storage volume 220, run an encryption algorithm on the data, and then write the data back to the storage volume 220. According to some embodiments, a ransomware activity detection system 160 is implemented on the storage system that is configured to detect ransomware activity, protect data that may be the subject of ransomware activity, and generate alerts to confirm whether particular activity on a storage volume 220 is legitimate or is related to ransomware activity.

In some embodiments, the storage system has an operating system 150. The operating system has a data services layer 155, which is the part of the operating system that manages the physical storage and retrieval of data on the physical storage. Thus, in some embodiments, when an IO 146 is received, the data services layer 155 of the operating system is involved with retrieval of data from global memory 138 and from managed storage resources 132. In some embodiments, the ransomware activity detection system 160 is implemented in the data services layer 155 of the storage system operating system 150, and acts to characterize and monitor input/output (IO) traffic and data characteristic of individual storage volumes 220.

Figure 2:
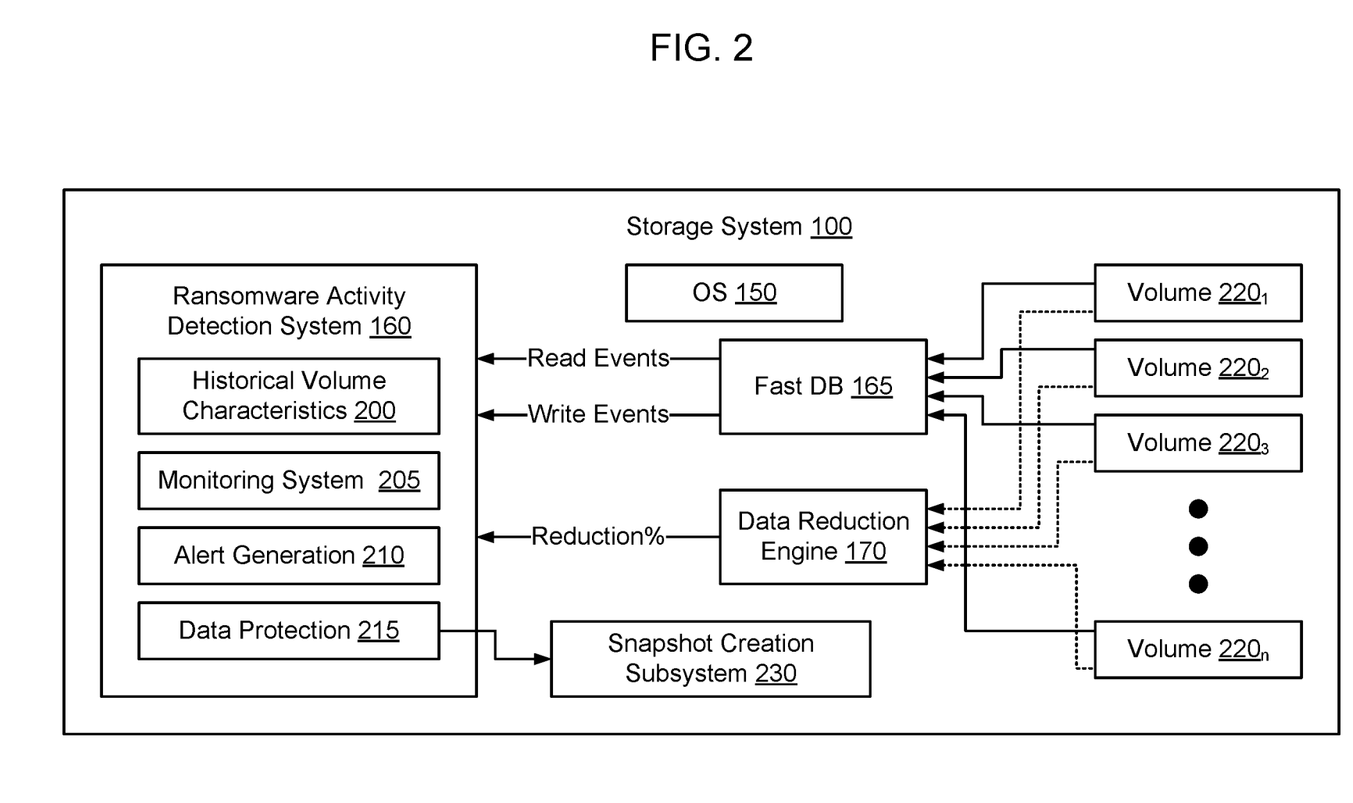
FIG. 2 is a functional block diagram illustrating an example storage system including a Ransomware Activity Detection System (RADS) configured to detect the occurrence of a ransomware attack on a storage volume, according to some embodiments.

FIG. 2 is a functional block diagram of an example storage system including a Ransomware Activity Detection System (RADS) 160, according to some embodiments. As shown in FIG. 2, in some embodiments the RADS 160 maintains historical volume characteristics 200 of storage volumes 220 that are being monitored for ransomware attacks. In some embodiments, the historical volume characteristics 200 include historic read/write IO activity of the storage volume 220 at the track/extent level, as well as characteristics of the data maintained in the storage volume 220. Additional details about the types of historical characteristics of the storage volumes 220 are provided below. The RADS 160 also includes a monitoring system 205 configured to monitor read/write IO activity of the storage volume 220 at the track/extent level, as well to monitor the data of the storage volume 220 to detect changing characteristics of the data maintained in the storage volume 220. The RADS 160 also includes an alert generation system 210 and, where the monitoring system 205 determines that current activity on the storage volume 220 indicates that a ransomware attack may be occurring, the alert generation system 210 generates and transmits an alert to notify of the possibility of occurrence of a ransomware attack. In some embodiments, the RADS 160 also includes a data protection system 215 configured to protect storage volumes 220 that may be the subject of a ransomware attack. The data protection system 215 can interface with systems native to the storage system 100, such as a snapshot creation subsystem 230 of storage system, to cause the storage system to protect the storage volume 220 until the ransomware threat is resolved.

In some embodiments, storage system 100 is configured to include a Fully Automated Storage Tiering (FAST) application that is used by the storage system 100 to monitor traffic patterns on storage volumes 220, and place more frequently accessed extents of data in faster tiers of storage, such that hot data is more readily available on the storage system 100. Specifically, to optimize throughput from the storage system, it is preferable to have extents with a high level of activity stored in higher performing storage tiers of managed storage resources 130, and to have extents with a lower level of activity stored in lower performing storage tiers of managed storage resources 130. Since the activity level of a given extent may change over time, the FAST application monitors access operations on extents, updates this information in the FAST database 165, and causes extents of the storage volumes 220 to be moved between storage tiers over time to optimize performance of the storage system.

In some embodiments, historic usage information about a particular storage volume 220 is accessed by the RADS 160 by reading information about IO operations on the extents of the storage volume 220 from the FAST database 165, to enable the RADS 160 to characterize historic read/write activity on the storage volume 220, and to characterize current read/write activity on the storage volume 220. Since the read/write activity is available on a per-extent level, both for the historic characterization and current characterization, the RADS 160 is able to detect possible ransomware activity at the per-extent level, rather than only being able to detect possible ransomware activity at the per-storage volume 220 level. Enabling the RADS 160 to monitor storage volume 220 traffic at the extent level enables much faster ransomware activity detection, to thus enable the RADS 160 to detect possible ransomware activity closer to the start of a ransomware attack.

When a ransomware attack is occurring, the ransomware application 105 will often cause a block read operation to occur on cold and aging data, followed by a bulk write on the same data. This type of data access pattern is used, in some embodiments, as one factor in making a determination that ransomware activity is occurring on a storage volume 220.

Another factor that can be used to detect the possible occurrence of a ransomware attack, is a significant change in the amount a particular storage volume 220 is able to be reduced in connection to being written to managed storage resources 130. As shown in FIG. 1, in some embodiments the storage engine 100 includes a data reduction engine 170, that is used to reduce the amount of data that is stored in managed storage resources 132. There are several types of data reduction that may be employed by data reduction engine 170, including deduplication and compression.

The effective amount of data (TBe) that hosts 102 can write to host devices 142, that can be stored on the usable disk space (TBu) of managed drives 132, will depend on whether the host data is able to be reduced by the data reduction engine 170 prior to storage on the managed storage resources 130. For example, data may be compressed to reduce the size of the data prior to storage on managed drives 132. Likewise, it is possible to perform deduplication (dedupe) to only store one copy of the host data rather than storing multiple copies of the same data. Likewise, the host data may include tracks that contain particular known patterns (such as all 0s or all 1s) that can be referenced using metadata instead of being stored on managed drives 132. Accordingly, the effective amount of storage (TBe) that is provided to hosts 102, which hosts 102 may use to write data to host devices 142, may be significantly larger than the amount of usable storage (TBu) of managed drives 132. For example, if the usable amount of actually usable disk space (TBu) on the managed drives 132 of FIG. 1 is 100 TB, and the data reduction engine 170 is able to achieve a Data Reduction Ratio (DRR) of 3:1, the effective capacity (TBe) of the managed drives 132 is 300 TB.

When a ransomware attack is occurring, the ransomware application 105 will often issue read operations on host device 142, encrypt the data, and then write the data back to the host device 142. This changes the data that is stored on the storage volume 220, which can cause the amount the data can be reduced by the data reduction engine 170 to change significantly. For example, the deduplication process implemented by the data reduction engine 170 will look to see if a portion of the data of the storage volume 220 is already contained in the storage volume 220. If this is the case, the storage system will only store one copy of the data to minimize the amount of back-end storage resources required to implement the storage volume. For example, if a storage volume 220 contains 100 copies of the same email, the data reduction engine 170 will store one copy of the email and create metadata pointing to the saved copy for the 99 copies, rather than separately saving every copy of the email. However, when the ransomware attack reads and encrypts data from the storage volume 220, the encrypted data is not likely to exactly match any other volume of encrypted data, thus preventing the deduplication engine from implementing deduplication on the data that is written back to the storage volume 220. This can cause the percentage reducibility of the data of the storage volume 220 to quickly change during a ransomware attack.

Accordingly, in some embodiments, the data reduction engine 170 maintains information about storage volumes $220_1$-$240_n$, and reports the % reducibility of each of the storage volumes 220 to the RADS 160. The RADS 160 uses the % reducibility information from the data reduction engine 170 to characterize the data of the storage volume 220, and monitors the data characteristics over time. In some embodiments, the data reduction engine 170 also reports data reduction information on a per-extent basis. For example, if a read occurs on an extent that was in a deduplication relationship with another extent, and then a subsequent write occurs on the extent that prevents the extent from participating in a deduplication relationship with another extent, that information is provided by the data reduction engine 170 to the RADS 160. A pattern of reads/writes on extents of a storage volume 220, with the corresponding change in reducibility, can indicate the possible presence of ransomware activity.

The age of the data, the sequentiality of the read/write operations, and the amount of the storage volume 220 that is being accessed are also used, in some embodiments, both to characterize the historical traffic patterns on the storage volume 220 and to look for anomalous current traffic patterns on the storage volume 220. For example, if a storage volume 220 is historically accessed in a random manner, and the current access is largely sequential, that change in access pattern can indicate that possible presence of ransomware activity. Likewise, if the host application accesses at most 1% of a given storage volume 220 in a given period of time, a bulk access request to read 5% of the given storage volume 220 or some other significantly larger percentage, may be interpreted by the RADS 160 as a possible indication of the presence of ransomware activity.

Figure 3:
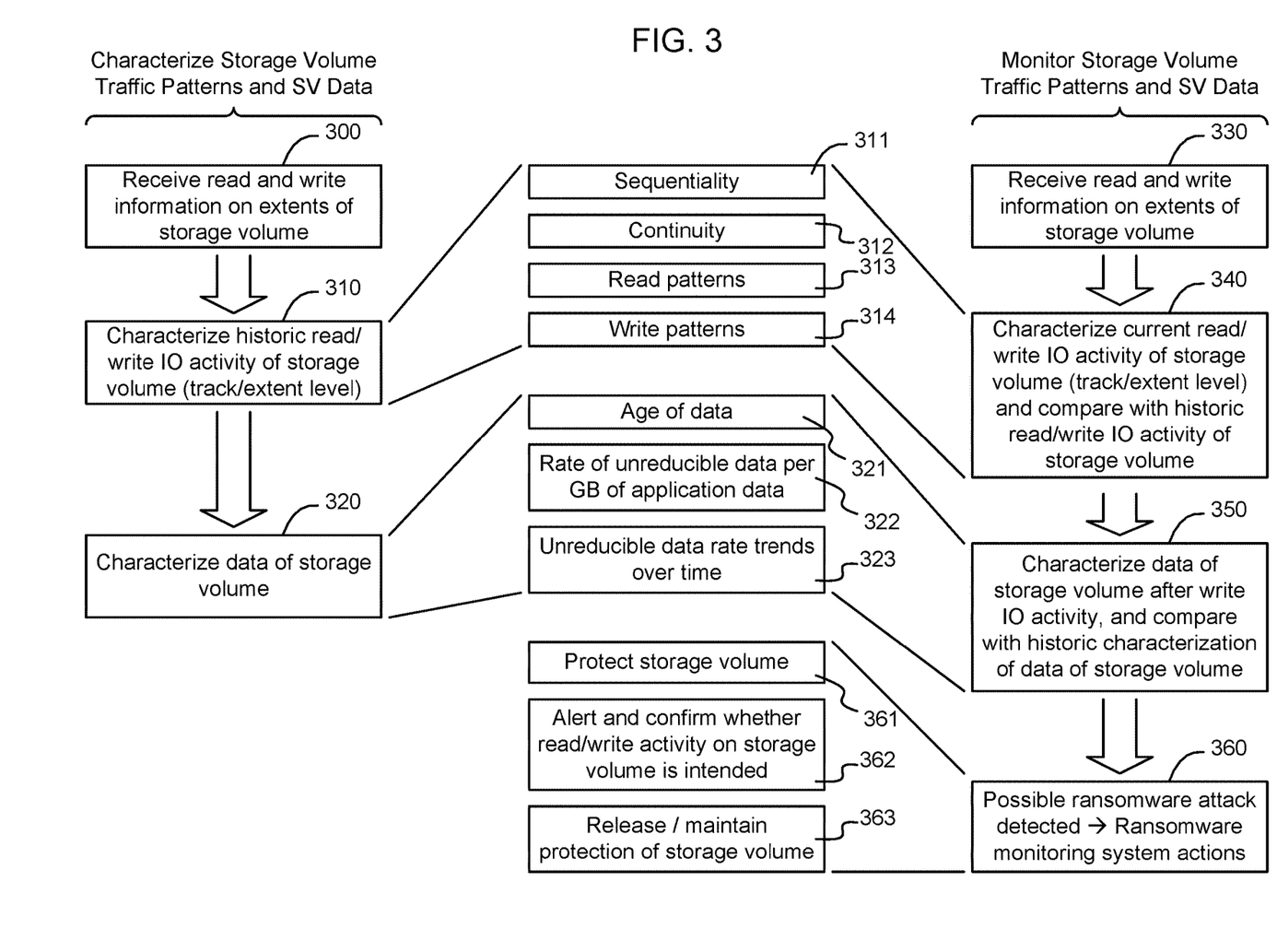
FIG. 3 is a flow chart of a process used by the Ransomware Activity Detection System of FIG. 2 to characterizing traffic patterns and data profiles on a per storage volume basis, and to monitor storage volume traffic patterns and data profiles on a per storage volume basis, to detect the occurrence of a ransomware attack on storage volumes on a per storage volume basis, according to some embodiments.

FIG. 3 is a flow chart of a process used by the Ransomware Activity Detection System of FIG. 2 to characterizing traffic patterns and data profiles on a per storage volume 220 basis, and to monitor storage volume 220 traffic patterns and data profiles on a per storage volume 220 basis, to detect the occurrence of a ransomware attack on storage volumes 220 on a per storage volume 220 basis, according to some embodiments. As shown in FIG. 3, in some embodiments the RADS 160 operates in two phases—during a first phase the RADS 160 characterizes Storage Volume (SV) 220 traffic patterns and storage volume 220 data itself. The storage volume 220 characterization process is shown on the left-hand side of FIG. 3. After the storage volume 220 historic characterization has been implemented, the RADS 160 moves to a monitoring phase, during which the storage volume 220 traffic patterns and storage volume 220 data is monitored for changes relative to the characterization values of the storage volume 220. During the monitoring phase, the RADS 160 monitors the storage volume 220 both as a whole and at the per-extent level, to monitor for changes in traffic patterns or changes in the data stored in the storage volume 220 that are characteristic of a possibility of a ransomware activity.

As shown in FIG. 3, during the characterization phase (left-hand side), the RADS 160 receives read and write information on extents of the storage volume 220 (block 300). The read and write operations are used by the RADS 160 to characterize historic read/write IO activity of the storage volume 220 on the track/extent level (block 310). In some embodiments, the RADS 160 aggregates read/write activity of the storage volume 220 over a period of time and uses that read/write activity to characterize the historic read/write IO activity. For example, the window of time may be a period of time immediately preceding a current time. Accordingly, the window of time may be a rolling window of several hours, to several days, over which the read/write activity of the storage volume 220 is used to generate historic read/write IO activity parameters characteristic of normal read/write IO activity on the storage volume 220.

One example characteristic of the storage volume 220 read/write IO activity might include the historic sequentiality of the read/write operations (block 311). Sequential read/write operations occur when the host application reads from sequential logical addresses of the production volume 220 or when the host application writes to sequential logical addresses of the production volume 220. Random read/write operations occur when the host application issues read or write IO operations to logical addresses of the production volume 220 that are not sequential. The sequentiality of the host application read/write operations may be used to generate a histogram or to populate another data structure that enables the RADS 160 to characterize the mean sequentiality of normal read and write IO operations by the host application on the storage volume 220.

Another example characteristic of the storage volume 220 traffic patterns might be the continuity of access operations on the storage volume 220 (block 312) by the host application during normal host application execution. For example, a particular host application might issue substantially continuous IO activity on a particular storage volume 220 during business hours, and then not issue any IO activity on the storage volume 220 during non-business hours. As another example, a particular host may normally not issue a significant number of read or write operations on a particular storage volume 220. By monitoring the continuity of the IO activity on the storage volume 220, the RADS 160 can determine a continuity signature for the storage volume 220 to characterize the IO operations over time, from an hourly, daily, and weekly perspective. Further, on a more granular basis, the RADS 160 can determine whether the storage volume 220 historically normally receives long sequences of IO operations in rapid succession, or whether the IO operations occur at random frequencies. By characterizing the continuity of common IO operations on the storage volume 220, it is possible to look for read and write IO operations that have a continuity signature that is anomalous from the historical continuity signature for the storage volume 220 that might be indicative of ransomware activity.

In some embodiments, the RADS 160 also looks at read patterns (block 313) and write patterns (block 314). Read and write patterns are related to continuity, but look at characterizing individual operations on the storage volume 220. For example, a particular application might never read data from an extent and then immediately write data back to the same extent. Other applications might exhibit these types of read/write operations. Other read/write patterns might include the total number of IO operations per unit time on the storage volume 220, the ratio of read operations to write operations, the size of the read and write operations, and other ways of characterizing the read and write operations on the storage volume 220.

In some embodiments, the RADS 160 also characterizes the data stored within the storage volume 220 (block 320). Unlike traffic patterns, in this context the RADS 160 is looking at the data of the storage volume 220 itself to determine, for example, the amount of data reduction that is able to be achieved on the data stored in the storage volume 220. For example, in some embodiments, the RADS 160 also looks at the age of the data (block 321). A given storage volume 220 might have relatively old data that is infrequently accessed. Other storage volumes 220 might have old data that is frequently read, but not often overwritten. The age of the data, when taken in connection with the read and write characteristics, can be used to look for anomalies in traffic patterns by the RADS 160 once the storage volume 220 has been characterized.

In some embodiments, the RADS 160 characterizes the data of the storage volume 220 by looking at the rate of unreducible data per GB of application data (block 322). In some embodiments the RADS 160 also characterizes the amount of unreducible data in the storage volume 220 over time (block 323). A given storage volume 220 might be changing such that the rate of unreducible data per GB of application data is steadily increasing or steadily decreasing. A sharp increase in the amount of unreducible data per GB of application data might be interpreted during the monitoring phase as a possible indication of occurrence of a ransomware attack.

Once the storage volume 220 has been characterized from both a traffic pattern standpoint (block 310) and from a storage volume 220 data standpoint (block 320) the RADS 160 uses the historic storage volume 220 characterization to monitor for conditions that might indicate the occurrence of a ransomware attack. The process of monitoring IO operations and storage volume 220 data characteristics is shown on the right-hand side of FIG. 3.

As shown in FIG. 3, in some embodiments the RADS 160 receives information about read and write operations that are being issued on the storage volume 220 (block 330), for example from the FAST database 165. The RADS 160 characterizes the current read/write IO activity of the storage volume 220, and compares the current read/write IO activity with historic read/write IO activity of the storage volume 220 (block 340). The "historic read/write IO activity" as that term is used herein, refers to the characterized historic read/write IO activity determined in block 310. In some embodiments, the RADS 160 uses the same factors to characterize the current read/write IO activity of the storage volume 220 as were used to characterize the historic read/write IO activity, namely:

the sequentiality of the current read/write operations (block 311);

the continuity of current read/write operations (block 312);

the read patterns of current read/write operations (block 313); and the write patterns of current read/write operations (block 314).

The RADS 160 compares the current read/write IO activity with historic read/write IO activity of the storage volume 220 (block 340). If the RADS 160 detects significant differences in current read/write IO operations, that is one factor that may indicate the possibility of a ransomware attack.

In addition to characterizing the current read/write IO operations, the RADS 160 also characterizes the data of the storage volume 220 (block 350) after implementation of a write operation and compares the data of the storage volume 220 after implementation of the write operation with historic characterization of the data of the storage volume 220. The "historic characterization of the data of the storage volume 220" as that term is used herein, refers to the characterized data of the storage volume 220 determined in block 320. In some embodiments, the RADS 160 uses the same factors to characterize the data of the storage volume 220 as were used to characterize the historic data of the storage volume 220, namely:

the age of the data experiencing the current read/write operations (block 321).

the rate of unreducible data per GB of application data (block 322); and the unreducible data rate trends over time (block 323);

The RADS 160 compares the current characteristics of the data of the storage volume 220 with historic characteristics of the data of the storage volume 220 (block 350). If the RADS 160 detects significant differences in characteristics of the data of the storage volume 220, that is one factor that may indicate the possibility of a ransomware attack.

The RADS 160 uses the output of block 340 and the output of block 350 to detect possible ransomware attacks (block 360). In some embodiments, the combination of (1) a detected significant difference in the current read/write IO activity, when compared with historic read/write IO activity of the storage volume 220 (block 340), and (2) a detected significant difference in current characteristics of the data of the storage volume 220 when compared with the historic characteristics of the data of the storage volume 220 (block 350), is used by the RADS 160 to determine that a possible ransomware attack is currently occurring.

When a possible ransomware attack is detected, in some embodiments the RADS 160 takes steps to protect the data of the storage volume 220 (block 361. Example ways of protecting the data of the storage volume 220 include creating a snapshot of the storage volume 220, creating a copy of each extent of the storage volume 220 that is the target of a read operation with a subsequent write back operation, or taking other action to maintain a copy of the storage volume 220 to prevent a ransomware attack from causing the data of the storage volume 220 to become encrypted, depending on the implementation.

In some embodiments, when a possible ransomware attack is detected, the RADS generates an alert to notify a storage administrator responsible for the storage volume 220 that a ransomware attack is possibly occurring (block 362). If the storage administrator confirms that the ransomware attack is occurring, the protected data can be used to restore the data of the storage volume 220. If the storage administrator confirms that a ransomware attack is not occurring, the RADS 160 can release protection of the data of the storage volume 220 (block 363).

Figure 4:
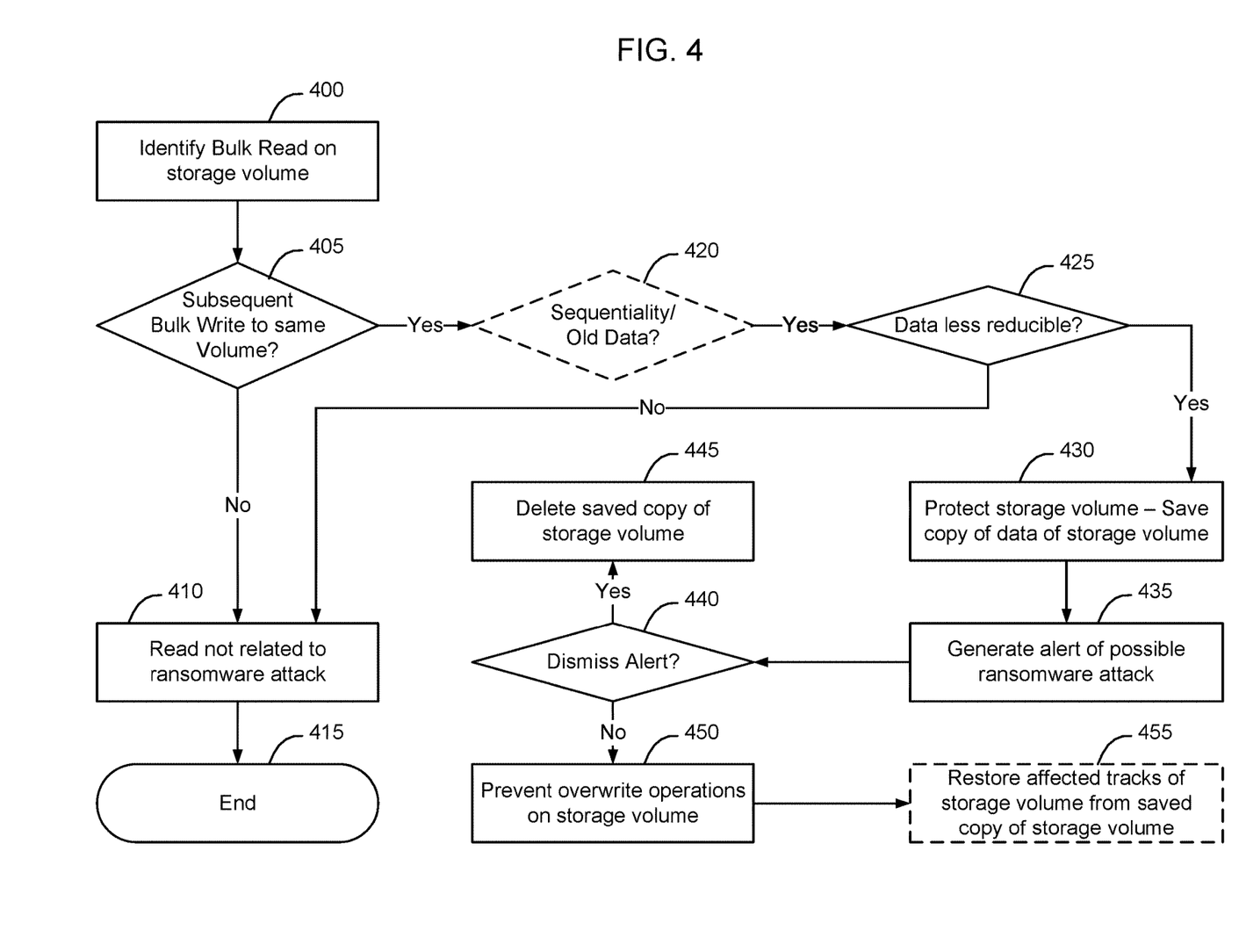
FIGS. 4 and 5 are flow charts of example methods of detecting the occurrence of a ransomware attack on a storage volume by the Ransomware Activity Detection System (RADS) of FIG. 2, according to some embodiments.
Figure 5:
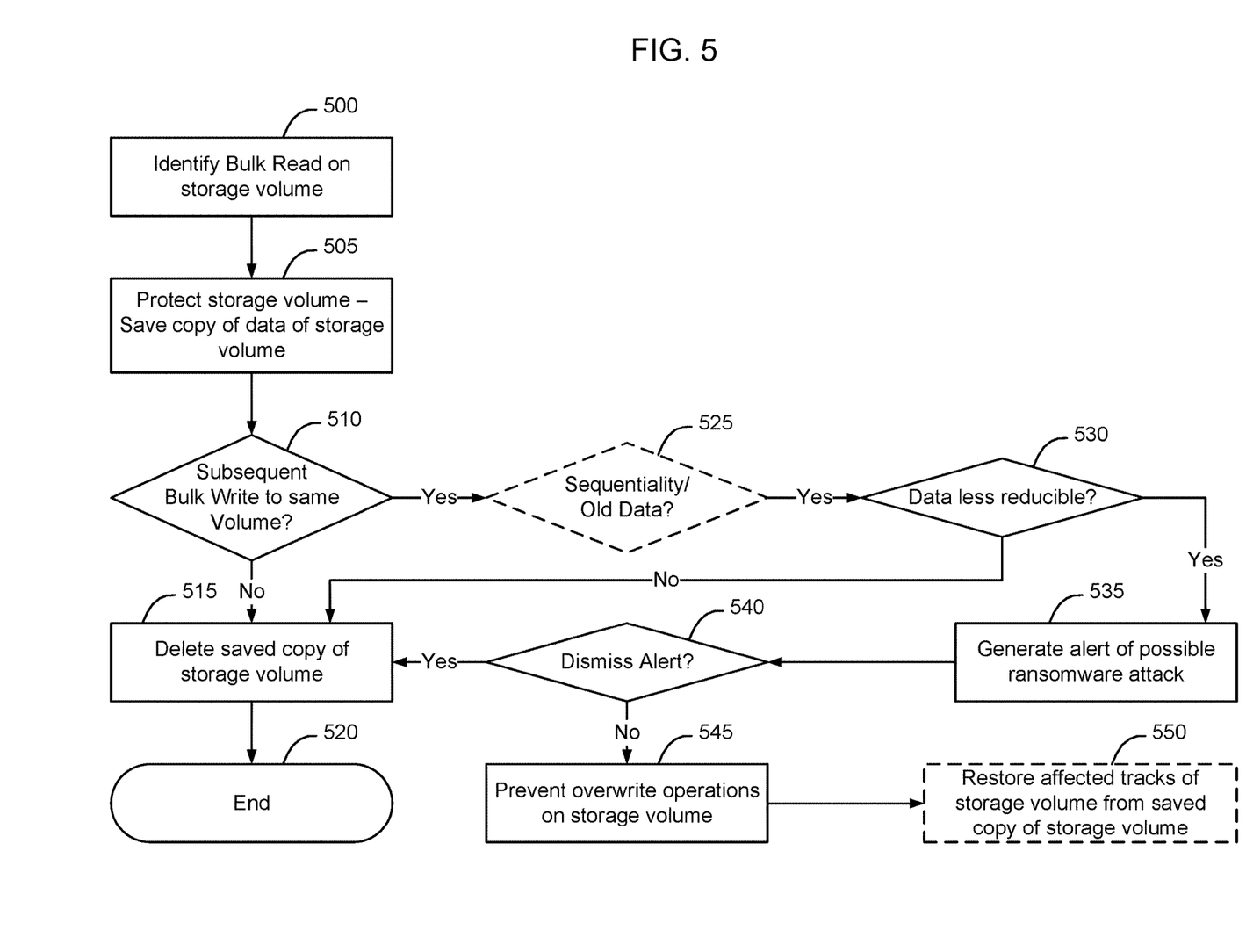

FIGS. 4 and 5 are flow charts of example methods of detecting the occurrence of a ransomware attack on a storage volume 220 by the RADS 160 of FIG. 2, according to some embodiments. The difference between FIGS. 4 and 5 is the timing of when the storage volume 220 or the affected extents of the storage volume 220 are protected. In FIG. 4, protection of the storage volume 220 begins after the RADS 160 detects the likelihood of occurrence a ransomware attack. In FIG. 5, protection of the storage volume 220 begins before the RADS 160 detects the likelihood of occurrence of a ransomware attack.

Ransomware attacks often involve a bulk read of data of a storage volume 220, followed by a bulk write of the data back to the storage volume 220. Accordingly, in FIGS. 4 and 5, the method is described as looking for bulk read operations and bulk write operations. More generically, the RADS 160 can look for any significant difference in the current read/write IO activity vs historic read/write activity in blocks 400 and 405. Additionally, ransomware attacks often occur using sequential reads/writes (block 420) and cause data of the storage volume 220 to be less reducible (block 425). Accordingly, in some embodiments the RADS 160 also monitors for these conditions in connection with determining whether a ransomware attack is likely to be occurring.

As shown in FIG. 4, in some embodiments the RADS 160 monitors each storage volume 220 to identify IO operation patterns indicative of a bulk read on a storage volume 220 (block 400). If a bulk read is identified, in some embodiments the RADS 160 then looks for a bulk write to the same storage volume 220 (block 405). If the RADS 160 does not identify occurrence of a bulk write on the storage volume 220 within a threshold period of time (a determination of NO at block 405), the RADS 160 determines that the bulk read was not likely related to a ransomware attack (block 410) and the process ends (block 410). The particular threshold period of time will vary depending on the implementation. In some embodiments, the threshold period of time is several seconds, in other embodiments the threshold period of time might be one hour, one day, one week, or another selected time interval depending on the implementation.

If the RADS 160 determines that a bulk write to the storage volume 220 has occurred within the threshold period of time (a determination of YES at block 405), the RADS 160 evaluates the characteristics of the data of the storage volume 220, for example to determine if the data that is being written back to the storage volume 220 is less reducible than the data that was read from the storage volume 220 (block 425). Optionally, the RADS 160 may also look at the age of the data that was read from the storage volume 220 and is now being written back to the storage volume 220 (block 420).

If the RADS 160 determines that a bulk read has occurred on a storage volume 220 (block 400), which was followed by a bulk write to the storage volume 220 within the threshold period of time (a determination of YES at block 405), and that the bulk write significantly changed characteristics of the data that was read from the storage volume 220 (a determination of YES at block 425) the RADS 160 takes action to protect the storage volume 220 (block 430), for example by saving a copy of the data of the storage volume 220 or saving a copy of the data that was the subject of the bulk read.

The RADS 160 also generates an alert of the possible existence of a ransomware attack (block 435). Although FIG. 4 shows the RADS 160 first protecting the data (block 430) and then generating an alert (block 435), these two steps can occur in either order or at the same time depending on the implementation.

Once the alert is generated, the storage administrator responsible for the storage volume 220 is presented with an option to dismiss the alert (block 440). If the alert is dismissed (a determination of YES at block 440) the RADS 160 removes protection on the storage volume 220 (block 445). For example, if a copy of the storage volume 220 was created, the copy of the storage volume 220 may be deleted since it is not required to be maintained to recover from a ransomware attack. If the alert is not dismissed (a determination of NO at block 440), in some embodiments the RADS orchestrates responding to and recovering from the ransomware attack. For example, in some embodiments the RADS 160 prevents overwrite operations on the storage volume 220 to stop the ransomware attack (block 450), and optionally restores affected tracks of the storage volume 220 from the saved copy of the storage volume 220 (block 445).

By characterizing both the historic read/write IO activity and the historic data characteristics of the storage volume 220, and then looking for a difference in both current read/write IO activity and current data characteristics of the storage volume 220, it is possible for the RADS 160 to greatly reduce the number of false ransomware alerts that are generated. For example, there are certain types of files, such as Magnetic Resonance Imaging (MRI) images, that often are not reducible. Looking only at changes to data characteristics of the storage volume 220 could result in generation of a ransomware attack alert in connection with writing these types of files to the storage volume 220, because writing these types of files could cause the percent reducibility of the storage volume 220 to change dramatically. Similarly, looking only at changes to read/write IO activity on the storage volume 220 could result in generation of a ransomware attack alert in connection with initiating a new backup process on the storage volume 220. By combining the two types of storage volume 220 monitoring, and by looking for changes in storage volume 220 characteristics by comparing current characteristics with historical characteristics, on a per-storage volume 220 basis, the RADS 160 is able to greatly reduce the number of false positive ransomware attack alerts. Specifically, since the RADS 160 knows what is normal (historic) for a given storage volume 220, the RADS 160 is able to detect anomalies in the historic read/write IO activity and detect anomalies in the data characteristics for the storage volume 220, to only generate a ransomware alert when changes in the read/write IO activity and data characteristics correspond to known patterns identified as indicative of a possible occurrence of a ransomware attack.

As noted above, ransomware attacks often involve a bulk read of data of a storage volume 220 followed by a bulk write of the data back to the storage volume 220. In some embodiments, as shown in FIG. 5, whenever a bulk read is received on a storage volume 220 (block 500) the RADS 160 takes action to protect the data of the storage volume 220 (block 505). For example, the RADS 160 may create a no-copy snapshot of the storage volume 220, may create a copy of the set of extents of data of the storage volume 220 that are the subject of the bulk read operation, or may take other protective action to protect the data of the storage volume 220.

The RADS 160 then looks for a bulk write to the same storage volume 220 (block 510). If the RADS 160 does not receive a notification of a bulk write on the storage volume 220 within a threshold period of time (a determination of NO at block 510), the RADS 160 determines that the bulk read was not likely related to a ransomware attack. The RADS 160 deletes the saved copy of the storage volume (block 515) and the process ends (block 520). The particular threshold period of time for determining that the bulk read was not associated with a ransomware attack may vary, depending on the implementation. In some embodiments, the threshold period of time is several seconds, in other embodiments the threshold period of time might be one hour, one day, one week, or another time interval.

If the RADS 160 determines that a bulk write to the storage volume 220 has occurred within the threshold period of time (a determination of YES at block 510), the RADS 160 evaluates the characteristics of the data of the storage volume 220, for example to determine if the data of the storage volume 220 is now less reducible than it previously was (block 530). Optionally, the RADS 160 may also look at the age of the data (block 525).

If the RADS 160 determines that a bulk read has occurred on a storage volume 220 (block 500), which was followed by a bulk write to the storage volume 220 within the threshold period of time (a determination of YES at block 510), and that the bulk write significantly changed characteristics of the data of the storage volume 220 (a determination of YES at block 530) the RADS 160 generates an alert of the possible existence of a ransomware attack (block 535). If the characteristics of the data of the storage volume 220 have not significantly changed (a determination of NO at block 530) the RADS 160 determines that the bulk read and bulk write were not likely to be associated with a ransomware attack and the saved copy of the data of the storage volume 220 that was created in block 505 is deleted (block 515). The process then ends (block 520).

Once the alert is generated, the storage administrator responsible for the storage volume 220 is presented with an option to dismiss the alert (block 540). If the alert is dismissed (a determination of YES at block 540) the RADS 160 removes protection on the storage volume 220 (block 515). For example, if a copy of the storage volume 220 was created, the copy of the storage volume 220 may be deleted since it is not required to be maintained to recover from a ransomware attack. If the alert is not dismissed (a determination of NO at block 540), in some embodiments the RADS orchestrates responding to and recovering from the ransomware attack. For example, in some embodiments the RADS 160 prevents overwrite operations on the storage volume 220 to stop the ransomware attack (block 545), and optionally restores affected tracks of the storage volume 220 from the saved copy of the storage volume 220 (block 550).

Figure 6:
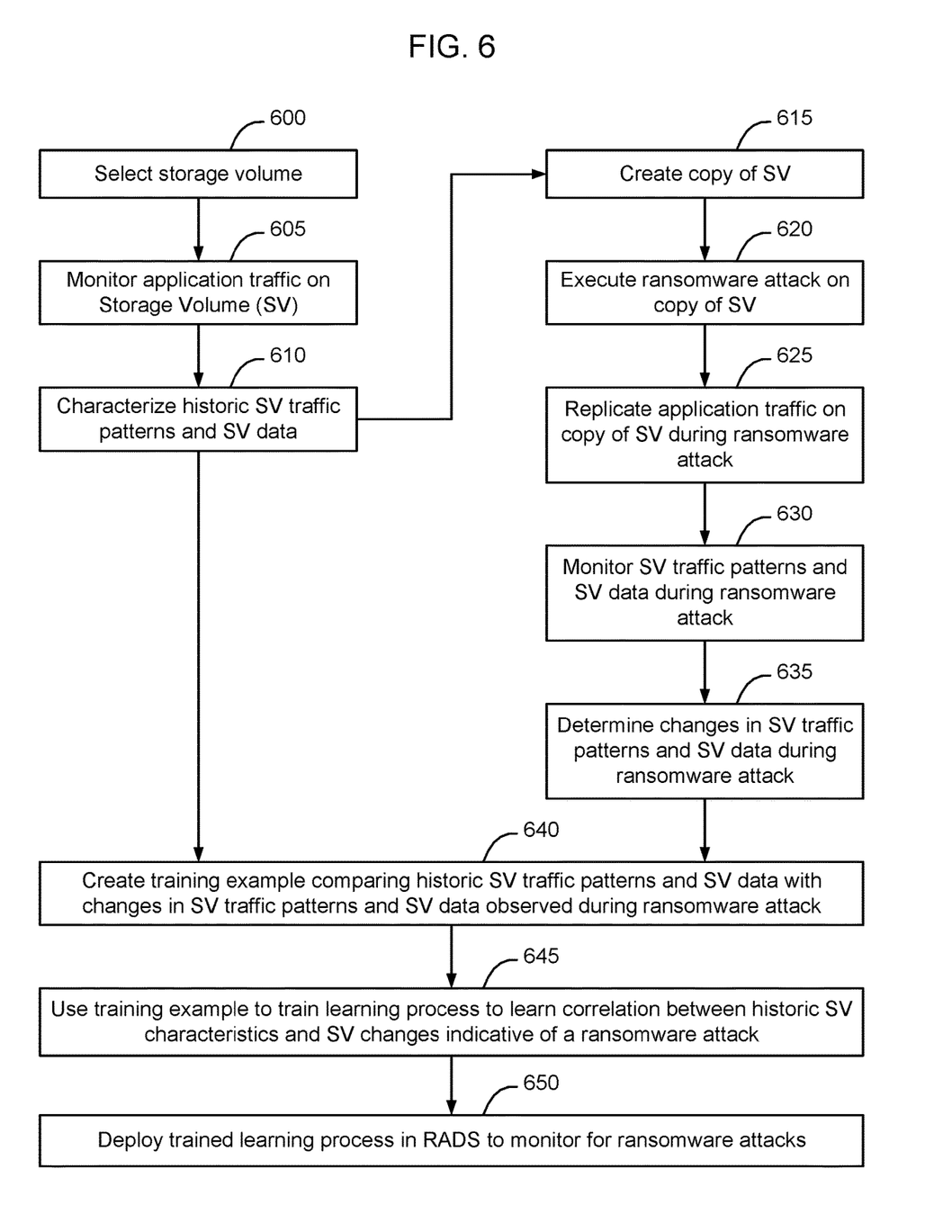
FIG. 6 is a flow chart of an example way of creating training examples for a learning process by simulating ransomware attacks, and using those training examples to train a learning process, according to some embodiments.

FIG. 6 is a flow chart of an example way of creating training examples for a learning process by simulating ransomware attacks, and using those training examples to train a learning process, according to some embodiments. In some embodiments, a storage volume is selected (block 600). The application traffic on the storage volume is monitored (block 605) to characterize the historic storage volume traffic patterns and storage volume data (block 610).

A copy of the storage volume is then created (block 615) and a ransomware attack is executed on the copy of the storage volume (block 620). Normal application traffic is replicated on the copy of the storage volume during the ransomware attack (block 625). Traffic patterns on the original storage volume and on the copy of the storage volume are monitored during the ransomware attack (block 630) to determine changes in storage volume patterns and storage volume data during the ransomware attack (block 635).

A training example is created comparing the historic storage volume traffic patterns and storage volume data characteristics with the changes in storage volume traffic patterns and storage volume data observed during the ransomware attack (block 640). This process is repeated multiple times to create multiple training examples. The training examples are used to train a learning process to learn a correlation between historic storage volume characteristics and storage volume changes indicative of a ransomware attack (block 645). The trained learning process is deployed in a Ransomware Activity Detection System to monitor for ransomware attacks (block 650).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for detecting existence of a ransomware attack on a storage volume, the computer program including a set of instructions which, when executed by a computer, cause the computer to perform a method comprising the steps of:
   determining historic read and write Input/Output (IO) activity characteristics of extents of the storage volume by a ransomware activity detection system implemented in a data services layer of a storage system operating system, the data service layer being part of the storage system operating system that manages physical storage and retrieval of data on the physical storage;
   comparing, by the ransomware activity detection system, current read and write IO activity characteristics of the extents of the storage volume with the historic read and write IO activity characteristics of the extents of the storage volume;
   determining occurrence of a large sequential read IO operation on a set of extents of the storage volume;
   in response to determining occurrence of the large sequential read IO operation, protecting the set of extents of the storage volume before determining occurrence of a large sequential write IO operation on the set of extents of the storage volume that was the subject of the large sequential read IO operation;
   after protecting the set of extents of the storage volume, monitoring for occurrence of the subsequent large sequential write IO operation on the set of extents of the storage volume that was the subject of the large sequential read IO operation;
   determining, by the ransomware activity detection system, historic data reducibility characteristics of data contained in the extents of the storage volume;
   comparing, by the ransomware activity detection system, current data reducibility characteristics of data contained in the extents of the storage volume with the historic data characteristics of the data contained in the set of extents of the storage volume; and
   detecting occurrence of the ransomware attack on the storage volume by the ransomware activity detection system where:
      the large sequential read IO operation on the set of extents of the storage volume is followed by occurrence of the large sequential write IO operation on the set of extents of the storage volume;
      the current read and write IO activity characteristics of the extents of the storage volume are significantly different than the historic read and write IO activity characteristics of the extents of the storage volume; and
      the current data reducibility characteristics of data contained in the set of extents of the storage volume that was the subject of the large sequential read IO operation are significantly different than the historic data reducibility characteristics of data contained in the set of extents of the storage volume that was the subject of the large sequential read IO operation.

2. The non-transitory tangible computer readable storage medium of claim 1, wherein the read and write IO activity characteristics comprise a sequentiality characteristic of read and write IO activity;

wherein a historic sequentiality characteristic quantifies how often read and write IO activity on the storage volume previously occurred to sequential extents of the storage volume; and wherein a current sequentiality characteristic quantifies whether current read and write IO activity is occurring on sequential extents of the storage volume.

3. The non-transitory tangible computer readable storage medium of claim 1, wherein the read and write IO activity characteristics comprise a continuity characteristic of read and write IO activity;

wherein a historic continuity characteristic quantifies how often read and write IO activity on the storage volume previously occurred in a continuous manner on extents of the storage volume; and wherein a current continuity characteristic quantifies whether the current read and write IO activity is occurring on extents of the storage volume in a continuous manner.

4. The non-transitory tangible computer readable storage medium of claim 1, wherein the read and write IO activity characteristics comprise a read and write pattern characteristic of read and write IO activity on individual extents of the storage volume;

wherein a historic read and write pattern characteristic quantifies how often read operations on particular extents of the storage volume are coupled with subsequent write operations on the particular extents of the storage volume; and wherein a current read and write pattern characteristic quantifies how often read operations on the particular extents of the storage volume are currently coupled with subsequent write operations on the particular extents of the storage volume.

5. The non-transitory tangible computer readable storage medium of claim 1, further comprising determining an age of the data contained in the set of extents of the storage volume that was the subject of the large sequential read IO operation.

6. The non-transitory tangible computer readable storage medium of claim 1, wherein the data reducibility characteristics comprise an amount of unreducible data per GB of application data stored in the storage volume.

7. The non-transitory tangible computer readable storage medium of claim 1, wherein the data reducibility characteristics comprise a rate of change of an amount of unreducible data per GB of application data stored in the storage volume.

8. A method of detecting existence of a ransomware attack on a storage volume, comprising:

determining historic read and write Input/Output (IO) activity characteristics of extents of the storage volume by a ransomware activity detection system implemented in a data services layer of a storage system operating system, the data service layer being part of the storage system operating system that manages physical storage and retrieval of data on the physical storage;

comparing, by the ransomware activity detection system, current read and write IO activity characteristics of the extents of the storage volume with the historic read and write IO activity characteristics of the extents of the storage volume;

determining occurrence of a large sequential read IO operation on a set of extents of the storage volume;

in response to determining occurrence of the large sequential read IO operation, protecting the set of extents of the storage volume before determining occurrence of a large sequential write IO operation on the set of extents of the storage volume that was the subject of the large sequential read IO operation;

after protecting the set of extents of the storage volume, monitoring for occurrence of the subsequent large sequential write IO operation on the set of extents of the storage volume that was the subject of the large sequential read IO operation;

determining, by the ransomware activity detection system, historic data reducibility characteristics of data contained in the extents of the storage volume;

comparing, by the ransomware activity detection system, current data reducibility characteristics of data contained in the extents of the storage volume with the historic data characteristics of the data contained in the set of extents of the storage volume; and detecting occurrence of the ransomware attack on the storage volume by the ransomware activity detection system where:

the large sequential read IO operation on the set of extents of the storage volume is followed by occurrence of the large sequential write IO operation on the set of extents of the storage volume;

the current read and write IO activity characteristics of the extents of the storage volume are significantly different than the historic read and write IO activity characteristics of the extents of the storage volume; and the current data reducibility characteristics of data contained in the set of extents of the storage volume that was the subject of the large sequential read IO operation are significantly different than the historic data reducibility characteristics of data contained in the set of extents of the storage volume that was the subject of the large sequential read IO operation.

9. The method of claim 8, wherein the read and write IO activity characteristics comprise a sequentiality characteristic of read and write IO activity;

wherein a historic sequentiality characteristic quantifies how often read and write IO activity on the storage volume previously occurred to sequential extents of the storage volume; and wherein a current sequentiality characteristic quantifies whether current read and write IO activity is occurring on sequential extents of the storage volume.

10. The method of claim 8, wherein the read and write IO activity characteristics comprise a continuity characteristic of read and write IO activity;

wherein a historic continuity characteristic quantifies how often read and write IO activity on the storage volume previously occurred in a continuous manner on extents of the storage volume; and wherein a current continuity characteristic quantifies whether the current read and write IO activity is occurring on extents of the storage volume in a continuous manner.

11. The method of claim 8, wherein the read and write IO activity characteristics comprise a read and write pattern characteristic of read and write IO activity on individual extents of the storage volume;

wherein a historic read and write pattern characteristic quantifies how often read operations on particular extents of the storage volume are coupled with subsequent write operations on the particular extents of the storage volume; and wherein a current read and write pattern characteristic quantifies how often read operations on the particular extents of the storage volume are currently coupled with subsequent write operations on the particular extents of the storage volume.

12. The method of claim 8, further comprising determining an age of the data contained in the set of extents of the storage volume that was the subject of the large sequential read IO operation; and wherein the data reducibility characteristics comprise an amount of unreducible data per GB of application data stored in the storage volume or an amount of unreducible data per GB of application data stored in the storage volume.

* * * * *